INVENTOR.
H. M. VEAUX
BY Philip M. Bolton
ATTORNEY

INVENTOR.
H. M. VEAUX
BY Philip M. Bolton
ATTORNEY

Patented June 2, 1953

2,640,881

UNITED STATES PATENT OFFICE 2,640,881

MULTICHANNEL ELECTRICAL PULSE COMMUNICATION SYSTEM

Henri Maurice Veaux, St.-Leu-la-Foret, France, assignor to International Standard Electric Corporation, New York, N. Y., a corporation of Delaware Application July 3, 1947, Serial No. 758,852
In France August 6, 1943

Section 1, Public Law 690, August 8, 1946
Patent expires August 6, 1963

3 Claims. (Cl. 179—15)

This invention relates generally to a signal system in which the order of the signal is rearranged, and more particularly relates to a multichannel pulse communication system in which pulses of different channels are interleaved in time and in which the sequence of the pulses of the different channels is rearranged.

The present invention has for a main object practical methods of carrying into effect the system of multiple transmission by channels or paths successive in time, in so far as concerns:

In transmission, the distribution of the signals in successive channels or paths by a new process;

In reception, the reconstitution of the signals appertaining to the several channels by a new process.

The invention includes a new principle, put into operation with the object of producing a multiple system of transmission, relating to a process of form conversion or rearrangement of signals, with or without a change of duration.

In describing the invention, reference is had to the drawings in which.

A method of transmission by impulses is known where the signal is characterized by short impulses emitted at regular intervals and whose amplitudes represent the successive ordinates. Owing to the inertia of the receiving apparatus, or to the phenomenon of hearing persistence, the signal is received as a continuous signal. This system has the great disadvantage of requiring a relatively extended frequency spectrum which renders it particularly unsuitable for long distance radio communication. It is suitable for multiplex transmission, the intervals between impulses being used for other channels; but the disadvantage indicated above for operating with single channel working is herein particularly marked. It is a question, in effect, of transmitting effectively the discontinuities obtained, in passing from an impulse belonging to one channel to the impulse which follows belonging to another channel.

Figure 1:
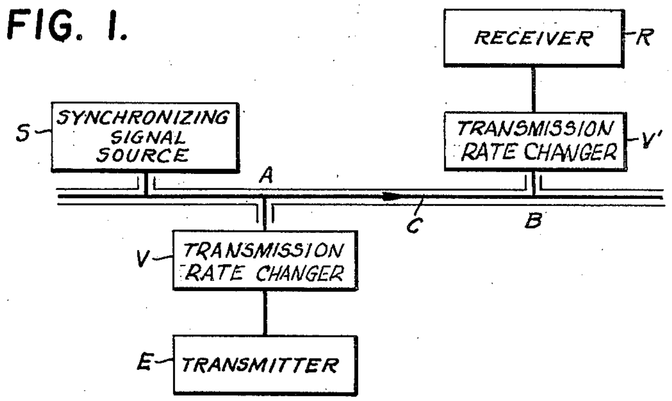
Fig. 1 is a schematic diagram of a multiple transmission system using a change of duration at both the transmitting and receiving end.

A system of multiplex transmission is equally known, involving a change of duration or rate of transmission and reception and of which Figure 1 shows the general principle for communication between a transmitting station E and a receiving station R. This communication involves two paths EA and BR of secondary lines of narrow band pass characteristics, and a path AB of a coaxial line or wide band circuit.

A source S acting at any point whatever of the coaxial line circuit, emits according to a periodic law of period T, short signals widely spaced in proportion to their individual durations. On practice these signals are identical, with the exception of the last signal of period T, and regularly spaced. The interval of time comprised between the moments $t_1$ and $t_2$ of the transmission of two successive signals, moments reckoned from the beginning of a period T, is allotted by means described later, to the transmission between A and B.

The transmission of section E terminates at the point of connection with the coaxial line in a transmission-rate changer V. The transmitted signals are recorded there automatically during a period T and are repeated, with a changed duration, in the interval of time $t_1t_2$ which follows. When recorded on the transmission-rate changer V′ they are repeated with changed duration in the opposite sense to the preceding one and in a time T, at the origin of the secondary line V′R.

In the path AB, the transmission is broken up into parts or sections pertaining to the various channels, and it is by the juxtaposition of the parts of the same channel that one obtains at the output of V′ a reconstitution of the signals sent out by the transmitting apparatus E.

This system differs essentially from the impulse system by the two changes of duration during transmission and reception. Each transmitted section or part comprises a collection of signals and no longer a simple characteristic impulse indicative of an instantaneous value. The number of sections to be juxtaposed on reception, equal to 1/T per second, is relatively small and the band occupied for a given number of paths is reduced to the strict minimum. But this advantage is balanced by the complication of the apparatus, each path requiring two transmission-rate changes V and V'.

The system, which is the subject of the present invention, combines the advantages of the two systems which have just been described, without having their disadvantages. According to this:

One converts the signals of each channel into equidistant impulses characteristic of the successive ordinates and interleaves regularly with one another the impulses appertaining to the various channels.

One uses a single cathode beam for inscribing impulses, in such manner that the signals emitted in a period of time T on the various paths of number N appear in the form of an inscription made of N sections of the same length each representing the signals emitted on a path; this inscription is swept in the time T which follows by the same beam, whilst the recording is carried out on a similar installation.

This process results, in fact, from the combination of the known process of impulse transmission, and of multiple transmission by interleaving impulses; with the process consisting in regrouping under a different form the same signals in the course of a repetition, without a change of duration or transmission rate, in a different order of the same signals preliminarily recorded.

This last process forms a new principle forming part of the invention and whose applications extend beyond the actual case where the recorded signals are derived from one or several paths or distributed or not, during the repetition between several paths and whether the conversion of shape is made with or without conversion of form.

Figure 2:
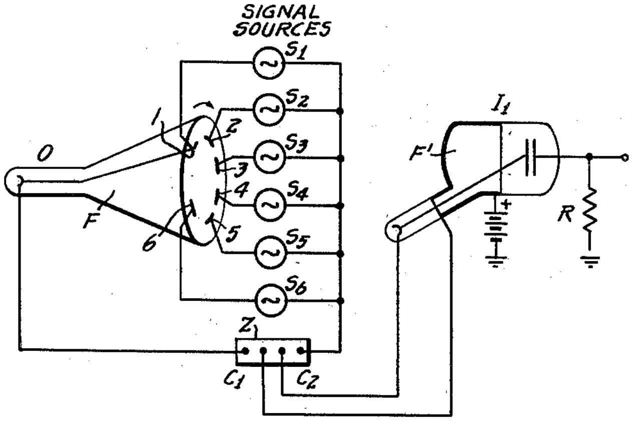
Fig. 2 is a schematic diagram of the transmitter of a multiple transmission system in accordance with the present invention.
Figure 3:
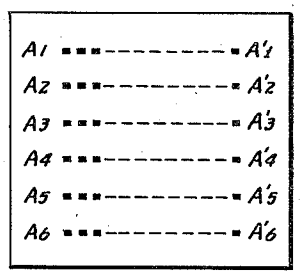
Fig. 3 is a schematic diagram illustrating the inscribing and scanning on the storage screen of the iconoscope in the system of Fig. 2.

One embodiment, given purely by way of example in the case of six paths, is arranged as follows (Figure 2):

A cathode tube O is provided on its base with six circular beam target elements or contacts numbered 1 to 6, each connected with one of the signal sources $S_1$ to $S_6$; the electronic beam F, is deflected with a circular movement of adequate uniform speed by the influence of a rotating field produced by customary means, successively sweeps the six contacts and converts the signals into successive impulses picked up at the output terminals $C_1C_2$ of the output impedance such as a common load resistor Z, and transmitted to the modulating grid of the beam F' of a cathode ray tube iconoscope $I_1$;

The beam F' is animated, in accordance with current practice in television, with a movement giving a scanning of the mosaic indicated in Figure 3 where the horizontal lines $A_1A'_1$ . . . $A_6A'_6$ represent each of the impulses arising from the channels $S_1$ to $S_6$; the inscription is made in the time by sweeping along the vertical lines comprised between $A_1A_6$ and $A'_1A'_6$.

The inscription effected in the time T between $A_1$ and $A'_6$ is swept in the time T which follows by the same beam F' sweeping horizontally the lines $A_1A'_1$ to $A_6A'_6$ whilst the inscription of the signals taken between $C_1C_2$ take place on another portion of the mosaic by means of a second cathode beam or on the mosaic of a second iconoscope; in a double gun iconoscope each of the two beams may be specialized to inscription and to repetition.

The principal advantage of this process resides in the possibility of obtaining an inscription comprising numerous paths from a single cathode beam F'; thus the difficulties in constructing an iconoscope with several guns are avoided.

The invention is obviously not limited to the construction described above. For example, instead of using an inscription in straight lines on the mosaic, the beam F' may be deflected circularly or in any other desired manner; further the cathode tube O, and the mosaic tube can be combined into a single member. In the same order of ideas, the mosaic tube can be replaced by a more complex system comprising an intermediate luminous reproduction by association of a cathode tube and an iconoscope; the signals picked up at the terminals of $C_1C_2$ (Figure 2) modulate the luminous spot on the screen of the cathode tube; the inscription obtained by the luminous signals acting on the mosaic of the iconoscope is swept in the appropriate direction by the beam of the iconoscope, the inscription and the de-ciphering being effected by different beams, a single installation suffices for a permanent transmission.

The foregoing processes also apply in reconstituting channels during reception. The first co-relative to that described above for transmission and which puts in play the same principle and the same practical arrangements, consists as follows:

In inscribing the signals received during the duration T of an "image" in successive sections, in N horizontal lines for example corresponding to E path;

In converting the signals, in the period T which follows, into successive impulses overlapping one another;

In directing the impulses appertaining to the same channel towards the corresponding receiver.

Figure 4:
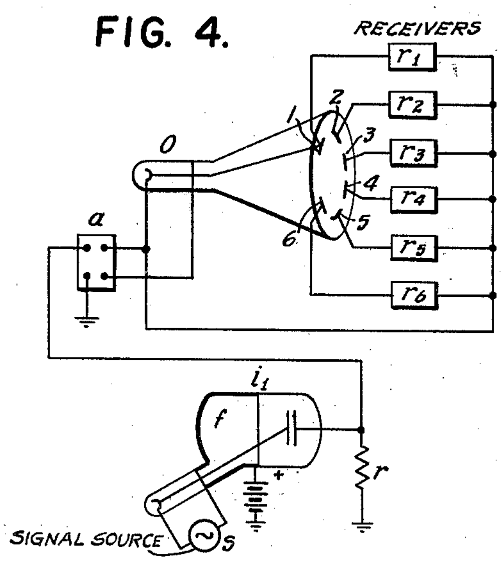
Fig. 4 is a schematic diagram of the receiver of the same multiple transmission system in accordance with the present invention.
Figure 5:
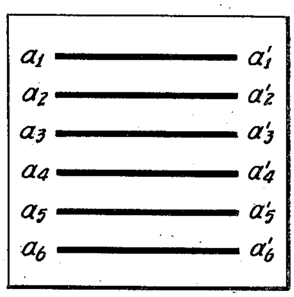
Fig. 5 is a schematic diagram illustrating the inscribing and scanning of the storage screen of the iconoscope of the system of Fig. 4.

One embodiment, given purely by way of example in the case of six channels, is as follows (Figure 4):

The signals of six successive sections received in a period T, applied at S, are inscribed in six horizontal lines for example (Figure 5);

In the period T which follows, the beam $f$ sweeps in vertical lines running from $a_1a_6$ towards $a'_1a'_6$;

The impulses obtained modulate, through the amplifier $a$, the beam $f'$ of a cathode tube, the beam moving with a circular movement under the effect of a rotating field regulated in speed and phase so that the impulses appertaining to each channel feed the corresponding receiver $r_1$ to $r_6$.

The second process consists:

In firstly filtering out signal sections appertaining to different channels.

Recording at high speed the signals received in the same channel and in repeating them at their normal speed.

Figures 6, 7:
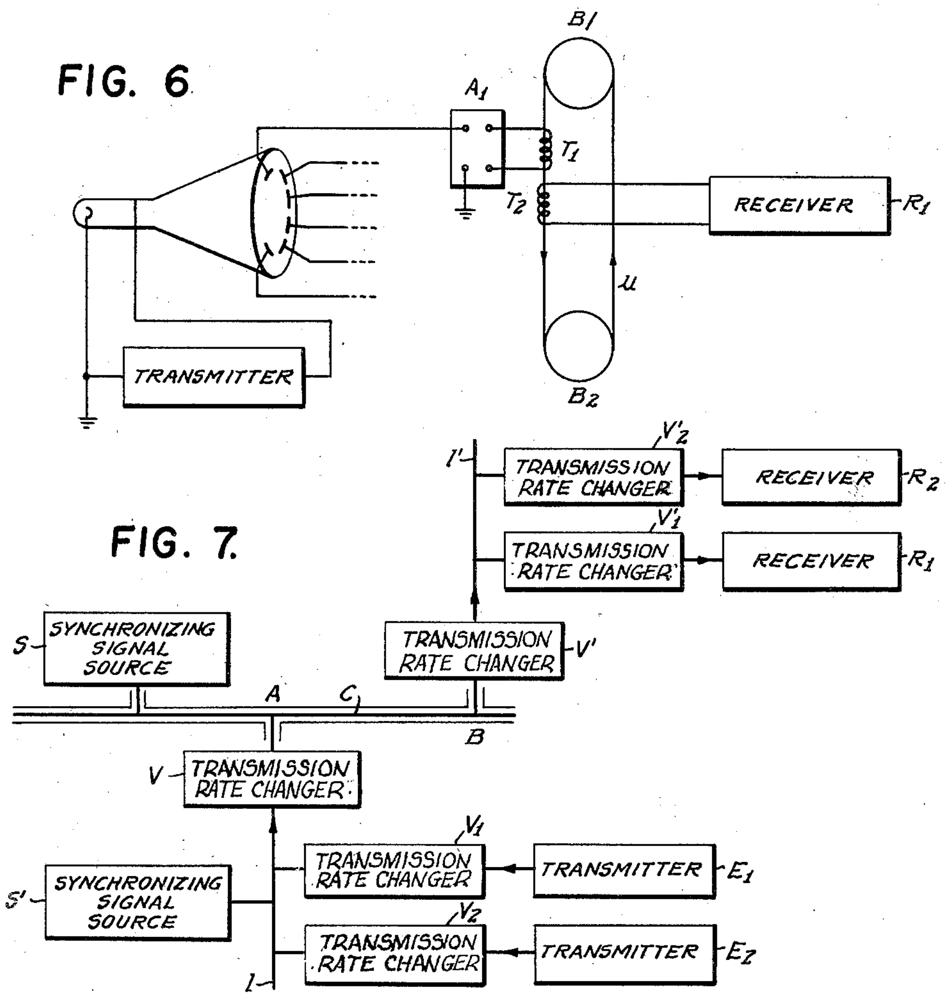
Fig. 6 is a schematic diagram of a modified multiple transmitter according to the present invention in which use is made of high speed recording.
Figs. 7 and 8 are schematic diagrams of different forms of complex communication networks employing the processes of the present invention.

Figure 6 gives, purely by way of example one embodiment in the case of six channels.

The first operation is effected by means of a cathode tube whose beam, rotating circularly in synchronism and phase with the transmission, is modulated by the signals to be separated, and sweeps 6 contacts.

The signals of each channel are amplified, recorded at high speed and repeated at normal speed; in the case of a number of channels not too large, the recording is effected, by means of a recording head T, on a steel wire $u$, for example, moving, between two wheels $B_1$ and $B_2$, with a uniform movement of suitable speed; the repetition is effected by a movable head $T_2$ whose speed is in a suitable fixed relation to that of the wire.

Arrangements suitable for the organization of a network may be based on the above-described system of multiplex transmission.

The repetition of the process of multiplex transmission with the object of obtaining multiplex paths between the transmitter E and the receiver R (Figure 1) offers appreciable advantages, which transform practically the problem of the organization of a complex network. In this case (Figure 7) the division of the time between the various paths on the auxiliary connection is effected from a source S' of separation signals, the connection between $E_1$ and $R_1$ for example, is effected through the transmission-rate changers $V_1$, V, V' and $V'_1$; V and V' correspond to conveyance on the coaxial C (distribution effected by the signals emitted by S); $V_1$ and $V'_1$ correspond to conveyance on the auxiliary line 11' (distribution effected by the signals emitted by S'). The distributions made along the coaxial line and along the auxiliary line are absolutely independent, but the durations of storage between $E_1$ and $R_1$ are added at $V_1$ and V. In telephony, for example, if one allows the image periods of $\frac{1}{16}$ sec. corresponding to the juxtaposition of 16 sections per second on reception, the lag between $R_1$ and $E_1$ due to simple storage is ½ sec. This arrangement, which can be repeated beyond two, enables a grouping of paths to be obtained, by sets of 12 for example. A triple repetition allows the creation of $12^3=1728$ paths in a coaxial line using transmission-rate changers of 12 channels each.

The organization of a network includes the distribution of synchronizing and phase setting signals. These may be created, from a single source. They may take the form of signals used in television for recording in lines or consist of a sinusoidal current intended to control the rotating field acting on the cathode beams. In the latter case, the control signals are sent out in an unoccupied low frequency band, comprised between 0 and 250 kc./s. in telephony for a total number of paths equal to 1000.

Figure 8:
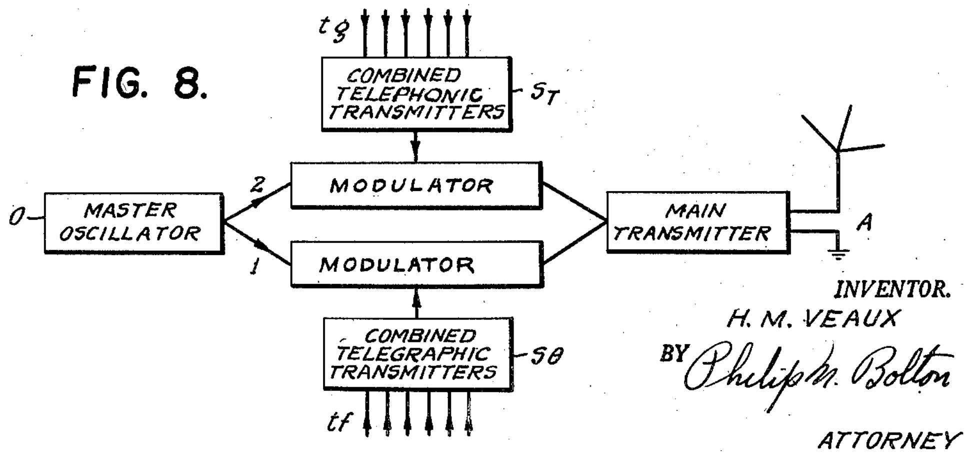

With respect to single band radio electric transmissions, it is possible to envisage only transmitting the carrier during a part of the time, during the duration of a special channel, for example, the transmission being then made with sufficient power. The transmission, repeated, if necessary, in the interval of "an image" will serve simultaneously, on reception, for synchronizing the oscillator for reconstituting the carrier, for controlling on the other hand, the mechanism for separating the signals appertaining to the different channels. Furthermore the frequency interval comprised between the carrier and the lowest side frequency may be used to obtain other transmission. Figure 8 illustrates a possible arrangement comprising a master oscillator O controlling two chains of transmission 1 and 2, the first *tf* allotted to the transmission of six telegraphic paths, for teleprinting, with a common aerial A. If the carrier has the frequency of 15 m. c./s., the single band global telephonic transmission is spaced out between $$(15 \text{ m. c./s.}+250\times6)$$

and (15 m. c./s.$+2700\times6$); the band comprised between the carrier and the lowest telephonic frequency (wide band of $6\times250=1500$ C./S. is available for telegraphic transmission of the type $A_1$ made on the chain 2; the manipulated telegraphic carrier is represented by the first upper side frequency obtained by modulating the frequency 15 m. c./s. given by 0 at the frequency $3\times250$. Thus on a band of 16.2 kc./s., there is obtained a multiplex transmission comprising six telephonic channels and six telegraphic channels.

The system of the invention gives an electrical solution for all kinds of telecommunication problems for the protection of radio-electric transmission against the phenomenon of fading, particularly fading of rapid incidence, by repetition of the signals during transmission and juxtaposition of the corresponding received signals. An example, by way of illustration, is as follows:

In transmission, the signal source draws from two or more contacts, from the contacts 1 and 4 for example, the inscriptions made (Figure 3) along $A_1A'$ and $A_4A'_4$ being then practically identical.

On reception, the contacts 1 and 4 (Figure 4) serve the same receiver; the signals identical in the absence of fading along $a_1a'$ and $a_4a'_4$ (Figure 5) thus give the useful repetition.

Adjustment of the speed of rotation of the cathode beams fixes the protection in regard to the incidence of fading.

One may equally well replace the contacts of the cathode tubes by continuous crowns; the recordings are effected during transmission (Figure 3) along the continuous vertical lines $A_1A_6$ to $A'_1A'_6$ which are swept horizontally along a number of linex adjustable at will. In this case the use of the cathode tube O is no longer necessary and the signals issuing from the single source are recorded directly along the vertical lines during transmission and returned directly to the single receiver at the output of the amplifier *a* (Figure 4) on reception.

The above ideas may also be applied to transmission over several juxtaposed circuits of signals occupying a band too large for each circuit.

The transmitted signals are recorded for distribution of the sections repeated at slow speed along the juxtaposed circuits. They are recorded on reception at slow speed, and after having repeated them at their speed of dispatch, they are juxtaposed in suitable order. This process can be used particularly for the transmission of radio-diffusion signals along line sections not adapted for this purpose. The portable apparatus at the ends of the section can in this case, comprise recordings on steel wire.

In a general way, the new system gives an effect resulting in a change of duration.

On the reception side (Figure 4) it is adapted for the feeding of a battery of receivers $r_1$ to $r_6$ incapable of receiving individually the high speed signals applied at *s*; in the case of signals responding to a periodic law, it is possible by adjustment of the phase and speed of recording, to obtain identical records along the lines $a_1a'_1$ $a_6a'_6$; deciphering along the verticals gives a demultiplication of frequency; the repetition of the process superposes the effect of multiplication.

On the transmission side (Figure 3) converse results can be obtained.

While I have described above the principles of my invention in connection with specific apparatus, it is to be clearly understood that this description is made only by way of example and not as a limitation to the scope of my invention.

What is claimed is:

1. A multichannel pulse communication system comprising means for producing a plurality of trains of pulses, means for modulating each of said trains in accordance with the signal in a given separate channel, means interleaving the modulated trains of pulses to form a single multichannel train in which each pulse is preceded and followed by a pulse of another channel and means for rearranging the pulses of the multichannel train in successive groups each comprising a plurality of pulses, the pulses within each group all belonging to the same channel but being of a different channel from those of the adjacent groups, said rearranging means comprising a storage device, means for applying the pulses of said multichannel train to said device in a given order, and means for removing the stored pulse energy from said device in another order so that successive groups are formed each comprising a plurality of pulses, the pulses within each group all belonging to the same channel but being of a different channel from those of the adjacent groups.

2. A system according to claim 1 wherein said storage device comprises a plurality of separate electrical storage elements.

3. A multichannel pulse communication system comprising means for producing a plurality of trains of pulses, means for modulating each of said trains in accordance with the signal in a given separate channel, means interleaving the modulated trains of pulses to form a single multichannel train in which each pulse is preceded and followed by a pulse of another channel and means for rearranging the pulses of the multichannel train in sucessive groups each comprising a plurality of pulses, the pulses within each group all belonging to the same channel but being of a different channel from those of the adjacent groups, said rearranging means comprising a cathode ray tube device including an electrical storage mosaic, means including an intensity control electrode for scanning said mosaic with an electron beam along a plurality of juxtaposed lines extending in a given coordinate, means for applying the multichannel pulses to said control electrode, to inscribe the pulses on said mosaic, and means for directing an electron beam to scan said mosaic along a plurality of juxtaposed lines extending in the other coordinate to transcribe the pulses.

HENRI MAURICE VEAUX.

References Cited in the file of this patent

UNITED STATES PATENTS

| Number | Name | Date |
|---|---|---|
| 2,036,350 | Montani | Apr. 7, 1936 |
| 2,105,016 | Smith | Jan. 11, 1938 |
| 2,175,573 | Schroter | Oct. 10, 1939 |
| 2,185,693 | Mertz | Jan. 2, 1940 |
| 2,275,224 | Henroteau | Mar. 3, 1942 |
| 2,312,897 | Guanella | Mar. 2, 1943 |
| 2,395,744 | Kent | Feb. 26, 1946 |
| 2,429,608 | Chatterjea et al. | Oct. 28, 1947 |

FOREIGN PATENTS

| Number | Country | Date |
|---|---|---|
| 928,783 | France | Dec. 8, 1947 |